UNITED STATES PATENT OFFICE.

JOHN W. BARKER AND JAMES P. HASKINS, OF SYRACUSE, NEW YORK.

IMPROVEMENT IN PURIFYING COMMON SALT.

Specification forming part of Letters Patent No. 34,179, dated January 14, 1862.

*To all whom it may concern:*

Be it known that we, JOHN W. BARKER and JAMES P. HASKINS, of the city of Syracuse, county of Onondaga, and State of New York, have invented a new and Improved Mode of Removing Impurities from Manufactured Salt; and we do hereby declare that the following is a full and exact description thereof, and of the mode adopted by us for the removal of the impurities found in almost all varieties of common salt.

It is known that nearly all varieties of common salt contain the chloride of calcium or chloride of magnesium, or both of them, in hurtful proportions, and that they are removed with difficulty and in the common process of manufacture but very imperfectly.

In our process we take the common salt to be purified, place it in a vat or vessel prepared for the purpose, and wash or rinse the salt thoroughly in a saturated brine in which we have dissolved an amount of any one of the carbonates of ammonia, or of any one or more or all of the sulphates of potash, soda, or ammonia, chemically the equivalent to the ascertained or estimated quantities of chloride of calcium and chloride of magnesium contained in the salt. In this way the chlorides of calcium and magnesium are decomposed, and there result chlorides of sodium, potassium, or magnesium, and carbonates or sulphates of lime and magnesia. The chloride of sodium produced remains with the salt operated on, while the carbonates of lime and magnesia and the sulphate of lime are found in suspension in the brine in minute particles, and are retained or held in suspension by a continued agitation or stirring of the brine while the washed or purified salt is being removed by the use of the ordinary salt scoops or shovels. The salt is deposited in baskets or other pervious vessels, and the chlorides of potassium and ammonium and the sulphate of magnesia remain depressed in the bath or brine.

We do not claim the mode of removing impurities from the brine by chemical reagents, for this we suppose is the common property of all. Neither do we claim the right to decompose the impurities by adding chemical reagents to the manufactured and dry salt, this right being already granted to another. Neither do we claim the right already secured to us for the purification of salt by Letters Patent No. 2,420, dated October 8, 1861.

We believe ours to be superior to the first method above disclaimed in point of economy; to the second mode above disclaimed in economy of labor and in the more perfect separation of the resulting compounds; and we believe it to be a valuable substitute for the third mode above disclaimed in cases where the agents therein mentioned cannot be readily obtained or where from their relative cost or from any other circumstance their use is inexpedient.

What we do claim as our invention or improvement, and desire to secure by Letters Patent, is—

The mode of decomposing the impurities in common salt by immersing or washing it in a solution of any one or more of the carbonates of ammonia or of any one or more of the sulphates of potash, soda, or ammonia, or of any combination of any of the above-named salts in saturated brine, as above set forth, through which means the chemical results stated are produced.

Dated Syracuse, New York, December 23, 1861.

JOHN W. BARKER.
JAS. P. HASKINS.

Witnesses:
Z. CHAS. FOOT,
HORACE H. WALPOLE.